(12) United States Patent
Lederer et al.

(10) Patent No.: US 8,976,739 B2
(45) Date of Patent: Mar. 10, 2015

(54) METHOD FOR OPERATING RADIO COMMUNICATION IN MULTI-RADIO LINK COMMUNICATIONS SYSTEM

(75) Inventors: Horst Lederer, Ismaning (DE); Jijun Luo, München (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 1692 days.

(21) Appl. No.: 11/991,598

(22) PCT Filed: Aug. 23, 2006

(86) PCT No.: PCT/EP2006/065598
§ 371 (c)(1),
(2), (4) Date: Oct. 13, 2009

(87) PCT Pub. No.: WO2007/028717
PCT Pub. Date: Mar. 15, 2007

(65) Prior Publication Data
US 2010/0034149 A1  Feb. 11, 2010

(30) Foreign Application Priority Data
Sep. 7, 2005  (DE) .......................... 10 2005 042 536

(51) Int. Cl.
| | |
|---|---|
| H04W 72/04 | (2009.01) |
| H04W 4/06 | (2009.01) |
| H04W 28/04 | (2009.01) |
| H04W 72/02 | (2009.01) |
| H04W 88/06 | (2009.01) |

(52) U.S. Cl.
CPC .............. *H04W 72/042* (2013.01); *H04W 4/06* (2013.01); *H04W 28/04* (2013.01); *H04W 72/02* (2013.01); *H04W 88/06* (2013.01)
USPC ............................ 370/329; 370/328; 370/332

(58) Field of Classification Search
USPC .................................................. 370/328, 332
See application file for complete search history.

(56) References Cited

U.S. PATENT DOCUMENTS

| | | | |
|---|---|---|---|
| 2003/0100308 A1 | 5/2003 | Rusch | |
| 2005/0041623 A1* | 2/2005 | Livet et al. | 370/332 |
| 2005/0169207 A1* | 8/2005 | Muniere | 370/328 |

FOREIGN PATENT DOCUMENTS

| | | | |
|---|---|---|---|
| EP | 1420604 | * | 11/2002 |
| EP | 1 420 604 A1 | | 5/2004 |
| WO | 2005/055524 A1 | | 6/2005 |

OTHER PUBLICATIONS

J. Luo et al.; "Investigation of Radio Resource Scheduling in WLANs Coupled with 3G Cellular Network"; IEEE Communications Magazine, Jun. 2003, pp. 108-115.

(Continued)

*Primary Examiner* — Dang Ton
*Assistant Examiner* — Pamit Kaur
(74) *Attorney, Agent, or Firm* — Squire Patton Boggs (US) LLP

(57) ABSTRACT

An item of network information pertaining to available resources, which are available for transmitting radio communication data in a multi-radio link communications system, is transmitted to network devices and/or subscriber stations by a coordination device. The item of network information assigns the available resources to groups, and the resources of different groups are assigned according to at least one common group feature.

19 Claims, 2 Drawing Sheets

(56) References Cited

OTHER PUBLICATIONS

A.C. Snoeren; "Adaptive Inverse Multiplexing for Wide-Area Wireless Networks"; IEEE Global Telecom Conference, vol. 3, 1999, pp. 1665-1672.

International Search Report for International Application No. PCT/EP2006/065598; mailed Dec. 12, 2006.

J. Luo et al., "Affecting Factors for Joined Radio Resource Management and a Realization in a Reconfigurable Radio System," 13th Meeting of Wireless World Research Forum, Mar. 2005, 14 pp.

J. Luo et al., "Gain Analysis of Joint Radio Resource Management for Reconfigurable Terminals," Multiradio Multimedia Communication, 2003, 4 pp.

\* cited by examiner

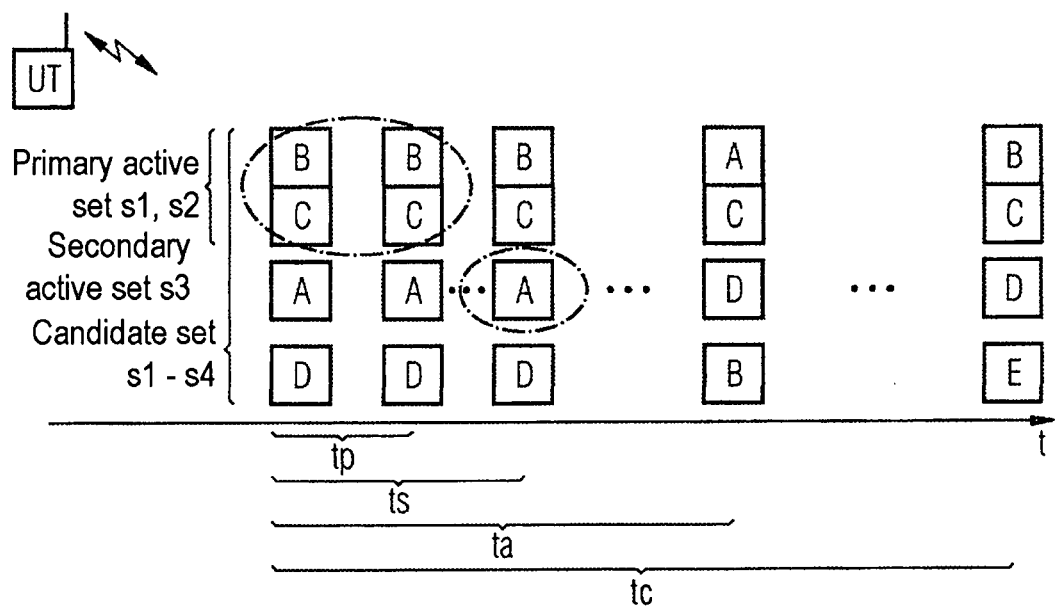

METHOD FOR OPERATING RADIO COMMUNICATION IN MULTI-RADIO LINK COMMUNICATIONS SYSTEM

CROSS REFERENCE TO RELATED APPLICATIONS

This application is based on and hereby claims priority to German Application No. 10 2005 042 536.4 filed on Sep. 7, 2005, the contents of which are hereby incorporated by reference.

BACKGROUND

Described below is a method for operating a radio communication in a multi-radio link communications system, an apparatus of a multi-radio link communications system performing such a method, and a subscriber station performing such a method.

In order to increase the resource efficiency and quality of service when transmitting data via radio links, multi-radio link communications systems are being developed in which a single subscriber station can access different resources simultaneously in parallel by one or more suitable interfaces. In particular, the intention is to enable access to resources of radio communications systems which are technologically different in kind, such that the subscriber station can operate for example in parallel both a mobile radio communications link and a radio link to a local area network. In particular, in this case a subdivision of a sequence of mutually associated data, for example of a common service, is intended to be able to be transmitted in subdivided fashion via the different resources.

In this case, the data are subdivided at the MAC or IP level (MAC: Media Access Control, IP: Internet Protocol), wherein MAC forms an interface between a logical link control and the physical layer of a network at a node and is configured differently for different physical media. In particular, the metrics resulting from subdivision into radio channels, quality, data flow and operator requirements differ. Consequently, multi-radio link communications systems afford a diversity via different resources which enable radio accesses.

In particular, three forms of transmission are planned. The first form is in a so-called switched MRTD (Multi-Radio Transmission Diversity), wherein packets of a data flow are transmitted sequentially and alternatively via only one resource which is available for MRTD. In accordance with a second form, a so-called parallel MRTD, the packets of a data flow are transmitted simultaneously via a plurality of available resources, wherein each packet is transmitted only via a single one of the resources. In accordance with the third form, a parallel MRTD with redundancy takes place, wherein the packets of a data flow are transmitted simultaneously via the resources which are available for MRTD, and wherein a copy of each packet is additionally transmitted in parallel via all resources selected for MRTD.

So-called multi-homing is generally known from J. Luo et al., "Affecting Factors for Joined Radio Resource Management and a Realisation in a Reconfigurable Radio System", WWRF 13th Meeting, Jeju-Island, Korea, Mar. 2-3, 2005, and J. Luo, R. Mukerjee, M. Dillinger, E. Mohyeldin and E. Schulz, "Investigation on Radio Resource Scheduling in WLAN coupled with 3G-Cellular Network", IEEE Communication Magazine, June 2003. Further principles are described in J. Luo etc., "Gain Analysis of Joined Radio Resource Management for Reconfigurable Terminals", Multiradio Multimedia Communications (MMC 2003), Dortmund, Germany, Feb. 26-27, 2003, and Alex C. Snoeren, "Adaptive Inverse Multiplexing for Wide Area Wireless Networks", Proc. of IEEE GlobeCom, Rio de Janeiro, December 1999.

Present-day solutions for data transmission are costly with regard to power consumption and signaling complexity, however, in the case of such a system and access method. A subscriber station disadvantageously scans all of the available resources in the form of the different radio access possibilities and their actual sub-resources available within such resources, which necessitates a great deal of power and signaling complexity. In the case of, for example, a multi-radio link access network having two resources, e.g. GPRS (General Packet Radio Service) at 128 Kbps and WLAN (Wireless Local Area Network/radio-based local area network) at 37 Mbps effective net data rate, and with a mobile subscriber station which supports both resources, each data packet is transmitted alternatively via one resource of the two resources if switched MRTD is selected. If the intention is to carry out a file download from the internet to the mobile subscriber station, the advantage with regard to a performance gain through the use of GPRS in addition to WLAN is negligible, even if the costs of the switched MRTD, for example as a result of a switching delay, are negligible.

Whenever available resources of a subscriber station offer different characteristics, for example 128 Kbps on a GPRS channel and 30 Mbps on a WLAN channel, there is the risk of the performance being impaired. The greater the difference in data rates between the resources used, the smaller the advantage of the MRTD, which also has resources having a low data rate, with regard to the total data rate.

In accordance with a second disadvantageous aspect, there is an increasing probability of a buffer overflow at the receiving subscriber station in the case of an increasingly larger data rate difference between the resources used, on account of a delay effect caused by the slow resource, if MAC segments/IP packets are re-requested in order to obtain them in the correct order at the receiver end. What is additionally disadvantageous is that a radio network subjected to a high degree of loading leads to a poor resource link on account of interference or a high dropout/blocking rate, which can be observed on the network or transport layer in the case of so-called ARMH (Adaptive Radio Multi-Homing) or IP layer multi-homing.

SUMMARY

An aspect is to improve a method for operating a radio communication in a multi-radio link communications systems in accordance with the MRTD concept, in particular, and to propose a suitable apparatus and a suitable subscriber station for carrying out such a method.

Preference is accordingly given to a method for operating a radio communication in a multi-radio link communications system, wherein a network information item regarding available resources, which are available for transmitting data, is transmitted to network devices and/or to subscriber stations by a coordination device, wherein the network information item assigns the available resources to sets and the resources of different sets are assigned in accordance with at least in each case one common set property.

Of advantageous embodiment is a method wherein the functionality of the coordination device is provided by an independent network-side device and the network information item is transmitted to network devices of communications systems which are technologically different in kind.

Of advantageous embodiment is a method wherein the network information item is transmitted to the subscriber station which can communicate in parallel via at least two different resources, wherein the subscriber station carries out the transmission of the data via at least two resources selected depending on the network information item.

Of advantageous embodiment is a method wherein an additional information item is transmitted to a network-side device from the subscriber station for updating the network information item, wherein the additional information item has an information content which deviates with respect to a network information item received by the subscriber station with regard to a resource availability detected by the subscriber station.

Of advantageous embodiment is a method wherein data portions of data of a service which are identical in kind are transmitted via different resources of a set.

Of advantageous embodiment is a method wherein the sets are provided individually by the coordination device for the subscriber station.

Of advantageous embodiment is a method wherein data portions of data of a service which are different in kind are transmitted via resources of different sets.

Of advantageous embodiment is a method wherein the different data portions are transmitted as, on the one hand, basic information items and, on the other hand, additional information items of the service. Of advantageous embodiment is a method wherein the data portions are formed from real-time data, on the one hand, and non-real-time data, on the other hand.

Of advantageous embodiment is a method wherein a respectively comparable obtainable, in particular time-dependent, data rate for the transmission of the data is assigned to the different sets as the set property thereof.

Of advantageous embodiment is a method wherein a service property is assigned to the different sets as the set property thereof.

Of advantageous embodiment is a method wherein a local or supraregional availability is assigned as the service property.

Of advantageous embodiment is a method wherein a scope of a subscriber or subscriber station access authorization of a subscriber communicating with the subscriber station or of the subscriber station is assigned as the service property.

Of advantageous embodiment is a method wherein the assignment of the available resources to the sets is updated in the case of changes in the availability and/or is updated for different sets from among the sets at different time intervals.

Of advantageous embodiment is a method wherein the assignment of the available resources is carried out depending on a current network usage.

Preference is given to an apparatus of a multi-radio link communications system for performing such a method using an interface for transmitting a network information item regarding available resources between network devices among one another or between a network device and a subscriber station, and a control device for providing the network information item with sets of available resources, wherein the resources within the different sets each have a common set property.

Of advantageous embodiment is an apparatus wherein the control device is arranged in an independent coordination device designed for communicating with network devices of different communications systems and for taking account of the resources of the different communications systems.

Of advantageous embodiment are a method and an apparatus wherein the different resources are radio resources of communications systems which are technologically different in kind, in particular the radio resources are assigned to mobile radio communications systems and/or local radio data networks.

Of advantageous embodiment are a method and an apparatus wherein the different resources are different radio resources of an individual communications system.

Of advantageous embodiment is a subscriber station of a multi-radio link communications system for performing such a method by an interface for transmitting a network information item regarding available resources from or to a network-side coordination device and for selecting at least two resources for a parallel transmission of data depending on a set of the transmitted sets which is selected by the subscriber station.

In this case, transmitting data should be understood preferably to mean both sending and receiving data. Data can include user or useful data that are generally to be transmitted, but also signalings. The term resource should generally be understood to mean a radio link access possibility via an arbitrary available radio network and the transmission capacities associated therewith. Accordingly, available resources in the form of network accesses of radio access systems which are technologically different in kind are preferably taken into account. Independently of this, for individual applications, resources in the form of carriers of different types, such as e.g. frequencies, and diversity methods etc., of an individual communications system can also advantageously be employed for the implementation of the method without necessarily having to access a resource of a technically different type of communications system.

The available resources are preferably classified in sets, wherein the available resources are assigned to the sets of correspondingly common properties, such that a radio transmission possibility which is optimized with regard to the set property can be taken as a basis when resources of a set are accessed simultaneously. The available sets are communicated to a subscriber station as a network information item and the subscriber station can subsequently select a set suitable for its current purposes. In this case, it is also conceivable for the network to signal to the subscriber station which set the subscriber station is to select. For radio links, the subscriber station subsequently uses resources which are specified in the selected set.

In this case, the set properties used as an assignment criterion can differ in their nature. A maximum MRTD data throughput is obtained if resources having identical characteristics, e.g. comparable data rates, are used for MRTD. Thus, by way of example, a subdivision according to transmission rates of the different resources can be performed, such that resources having a similar data rate which correspond to the requirements of the application to be transmitted are assigned to a set given high priority, while resources having a greatly different, in particular typically higher data rate are assigned to a set given low priority, in order e.g. to cover load spikes that occasionally occur.

As an alternative or in addition, however, it is also possible to use further criteria in the assignment of the resources to the sets as set properties. By way of example, a differentiation can be made as to whether the resource is a resource which is usually available supraregionally, e.g. a mobile radio communications system in accordance with e.g. GSM (Global System for Mobile Communication) or UMTS (Universal Mobile Telecommunications System), or is a resource which is only available regionally, e.g. a local area network in accordance with a WLAN or WiMAX standard. Consequently, a network availability or spatial network coverage can be taken into account.

A further possible set property is e.g. the possibility of an authentication and authorization of the subscriber station with respect to network-side apparatuses, as in the case of mobile radio communications systems. When compiling the network information item in the form of the different sets, it is also possible to take account of a current network usage or individual contract options or authorizations of the respective communicating subscriber station. Accordingly, the network information item can be created individually for a subscriber station that logs onto the network or communicates with the network and can be transmitted to the subscriber station. The transmission of a general network information item to all the subscriber stations and a corresponding selection of an available set by the subscriber station on account of the latter's options and access rights are also possible.

Ultimately, current speeds of a moving mobile subscriber station can also be taken into account in particular by the subscriber station since, in such a case, e.g. the access to local data networks is only ever possible temporarily.

A further advantageous utilization is afforded in the case of real-time data (RT), on the one hand, and non-real-time data (NRT), on the other hand, as in the case of an E-mail to be transmitted, if as real-time data e.g. a general header information item is forwarded via a mobile radio communications system for fast information to the subscriber station, while the attachment, i.e. the actual useful data are transmitted in parallel or, if appropriate, even only at a later point in time via a local area network—likewise connected to the internet—with a higher transmission rate or more favorable transmission conditions. A further example of a scaleability as a service property is a transmission of image data which has been subjected e.g. to a discrete cosign transformation and compares contour information items as data given high priority and filling information such as color values as data given low priority. In such a case, too, it is appropriate to divide the totality of the data between two different resources in accordance with the prioritization, since the contour data given higher priority are of fundamental importance for an image reconstruction, while the filling data given low priority, if appropriate, can also be replaced by interpolation or, if necessary, can also be completely omitted.

BRIEF DESCRIPTION OF THE DRAWINGS

These and other aspects and advantages will become more apparent and more readily appreciated from the following description of an exemplary embodiment, taken in conjunction with the accompanying drawings of which:

FIG. 2 is a table that shows, as network information items transmitted to the subscriber station, two tables with different sets of available resources, and FIG. 3 is a schematic data diagram that shows a subdivision into different types of sets and the updating cycles thereof.

DETAILED DESCRIPTION OF THE PREFERRED EMBODIMENT

Figure 1:
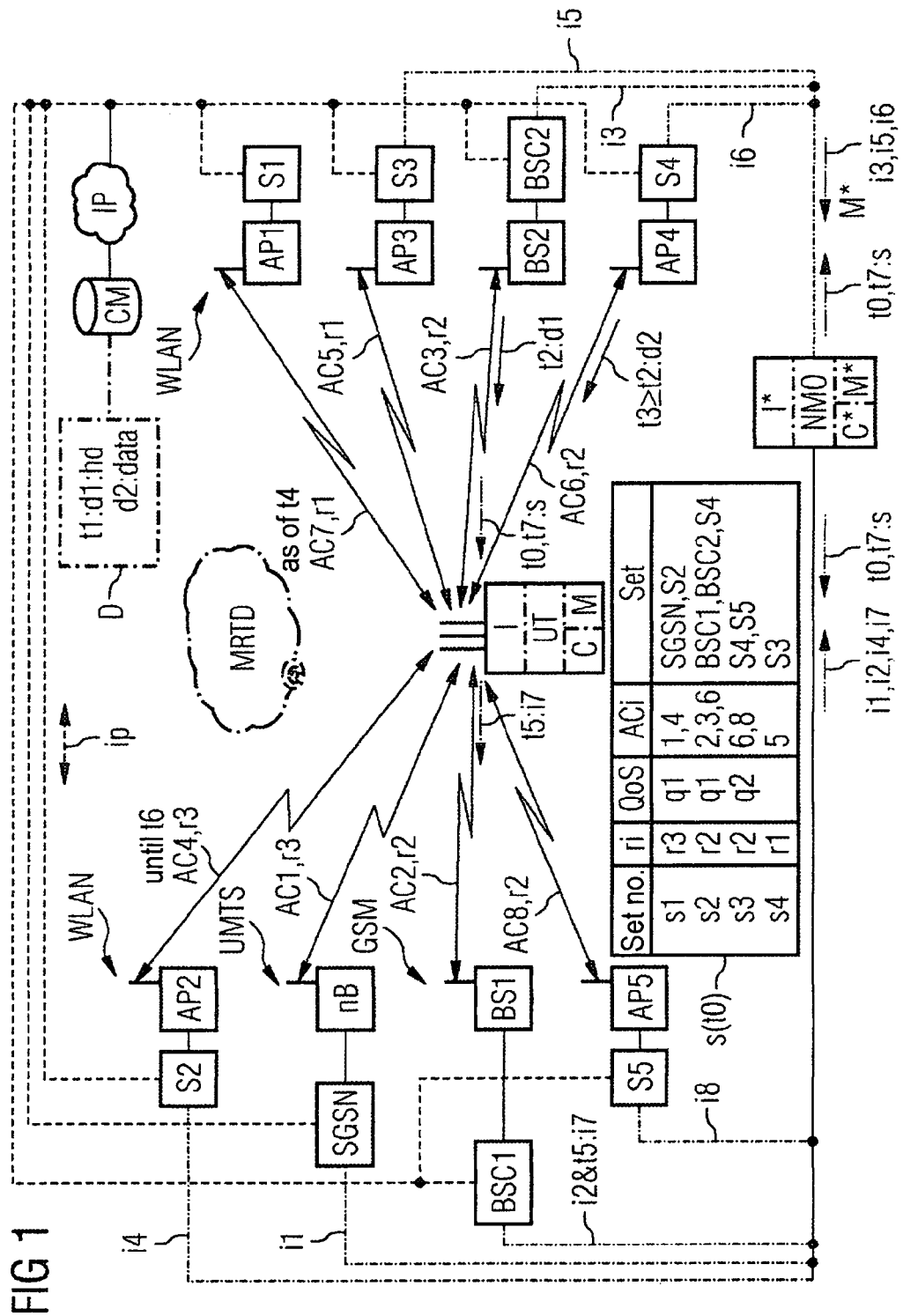
FIG. 1 is a block diagram that schematically shows apparatuses of communications systems which are technologically different in kind and a subscriber station which carries out a radio communication simultaneously or in parallel by a plurality of resources offered in this way.

Reference will now be made in detail to the preferred embodiments, examples of which are illustrated in the accompanying drawings, wherein like reference numerals refer to like elements throughout.

FIG. 1 shows an exemplary subscriber station UT, which as a stationary or mobile apparatus with an interface I for radio-based access can access resources of different types for operating a radio communication in a multi-radio link communications system MRTD. In a customary manner the subscriber station UT has a control device C for controlling its functions and a memory device M for storing operationally relevant data and user data. Instead of a single interface I, it is also possible to provide a plurality of interfaces which are specifically tailored to the different technologies and which are then connected to one another or correspondingly driven via the control device C in order to carry out as required a simultaneous or parallel radio communication via two or more available resources AC1-AC8. Optionally, it is also possible to choose just one available resource if a suitable second resource is not available or required.

On the network side, the multi-radio link communications system MRTD has for example three technologically different radio communications systems. For a portion of the radio communications systems, there are a plurality of logically or physically different access possibilities or resources to the respective technologically different radio communications systems in the current radio range of the subscriber station UT. By way of example, a central control device SGSN with a connected base station or radio interface nB operating in accordance with the UMTS standard is available in representative fashion for a first radio communications system. As a result, a first available resource AC1 is provided for the subscriber station UT for setting up a radio communications link with a first, very high data rate r3. In addition, by way of example, two central control devices BSC1, BSC2 with base stations or radio interfaces BS1 and BS2 correspondingly connected thereto in accordance with the mobile radio standard GSM are provided, which form two further available resources AC2, AC3 with a second, medium data rate r2 for the subscriber station UT. These first to third resources AC1-AC3 are therefore resources which simultaneously enable an authentication and authorization during the logging-on of the subscriber station UT in the context of setting up a radio communications link. In addition, mobile radio networks of this type are usually available as supraregional and mainly full-coverage radio link communications systems.

Local area networks in accordance with the WLAN standard are represented in a manner representative of a third technology of radio link communications systems, the networks predominantly being schematically depicted by in each case a server S1-S5 and in each case an access point AP1-AP5 connected thereto. These offer the subscriber station UT, depending on the configuration, different data rates from a very high data rate r3 in the case of the second access point AP2, a medium data rate r2 in the case of the fourth and the fifth access point AP5, and a low data rate r1 in the case of the third and the first access point AP1. Depending on the current whereabouts, this means that for the subscriber station UT there are access possibilities to further fourth to eighth resources AC4-AC8, which involve, for example, local radio link accesses without an authentication possibility and without an authorization possibility.

In the illustrated exemplary embodiment of the multi-radio link communications system MRTD, a coordination device NMO as a physically and/or logically software-technologically configured network management operator in the form of an independent apparatus performs a coordination of the overall system. It is also possible to integrate such a coordination device into one of the exemplary communications systems or into one of the corresponding control devices or one of the servers. For coordinating the different resources AC1-AC8 available, the coordination device NMO has a link to the respective central control devices SGSN, BSC1, BSC2 and servers S2-S5. According to the example illustrated, however, there is no direct link to the first server S1 on the part of the coordination device NMO.

The coordination device NMO coordinates the transmission of data between the different central control devices SGSN, BSC1, BSC2 and servers S1-S5 insofar as these can correspondingly access a database that can be accessed jointly. Such a database that can be accessed jointly may be for example a central memory device CM which can be accessed via the internet IP and corresponding access links ip of the different radio link communications systems. As an alternative or in addition, the coordination device NMO directly coordinates the transmission of data between the different radio devices or radio control devices nB, BS1, BS2, AP1-AP5. This increases the MRTD gain further since the coordination device then lies closer to the radio interface. A multi-radio link base station with integrated coordination device is ideally provided for MRTD.

For coordination purposes, signaling items and information items are transmitted between the different radio link communications systems and the coordination device NMO. In this case, the coordination device NMO receives first network information items i1-i6, i8 from the radio link communications systems SGSN, BSC1, BSC2, AP2-AP5, wherein the first network information items i1-i6, i8 communicate availability information items and property information items of the respective radio link communications systems SGSN, BSC1, BSC2, AP2-AP5 to the coordination device NMO. The coordination device NMO transmits, for its part, to the radio link communications systems SGSN, BSC1, BSC2, AP2-AP5 network information items for the control thereof and a network information item s for controlling the communicating subscriber station UT.

The coordination device NMO advantageously has, in particular in the case of an independent coordination device, a control device C* for coordinating its operation and the communication with the different devices of the diverse communications systems and an interface I* for carrying out the communication with further systems. Data which are relevant, or may be relevant if appropriate, with regard to the management of the diverse available resources for the coordination device NMO are stored in a memory M*. Information items with regard to services which a subscriber station UT can select are also advantageously stored in the memory M*. Resource-dependent information items are, for example, available data rates ri, r1-r3 of the resources. As service features, service properties q1, q2 of different types are stored in the memory M* such that the control device C* can access a multiplicity of criteria of different types in order to suitably assign the available resources AC1-AC8 to the available sets s1-s4 according to a multiplicity of criteria. In this case, the sets can be provided uniformly for all the subscriber stations or else preferably specifically for individual subscriber stations UT.

FIG. 1 shows by way of example in tabular form the construction of a network information item s which is transmitted to the subscriber station UT at a starting instant t0 and is intended to enable the subscriber station UT to access resources AC1-AC8 that are currently suitable for the latter. The network information item s thus transmitted to the subscriber station UT includes for example four sets s1-s4 with an assignment of the different resources ACi to in each case at least one of the sets s1-s4. The table additionally illustrates two exemplary criteria for set properties according to which the coordination device NMO compiles the sets s1-s4.

By way of example, the first set s1 given the highest priority is assigned the first and the fourth resource AC1, AC4, which both offer a very high data rate r3, wherein as a requirement with regard to a service property QoS, q1 on the part of the coordination device NMO an assignment to this first set s1 is effected only if at least one resource AC1 enables an authentication of the subscriber station UT. When the first set s1 is selected, the subscriber station UT can correspondingly communicate via the first and via the fourth resource AC1, AC4 in parallel with one another, wherein data can be transmitted in accordance with UMTS and in accordance with WLAN, respectively.

A second set s2 is formed from the second, third and sixth resources AC2, AC3, AC6, which offer a medium data rate r2 and likewise at least one authentication possibility. Accordingly, the subscriber station UT can access three of the available resources when the second set s2 is selected. A third set s3 is assigned to the sixth and the eighth resource AC6, AC8, which offer a medium data rate r2 and are classified as quality of service q2 as local area networks. The latter enable a generally more cost-effective access than mobile radio networks. A fourth set s4 with the criterion of the low data rate r1 is only assigned the fifth resource AC5 of the third local area network s3. The seventh resource AC7 was disregarded when forming the set s1-s4 for lack of a direct link for exchanging first network information items i7 between the first server S1 and the coordination device NMO.

After logging on at one of the radio interfaces BS2, the network information item s created at the coordination device NMO is transmitted to the subscriber station UT via the radio interface or base station BS2 at the starting instant t0. Depending on the configuration and requirements, the subscriber station UT thereupon selects resources of one of the sets for its subsequent communication, in order to communicate as required via one or in parallel a plurality of the resources.

By way of example, data of a retrievable E-mail are ready for the subscriber station UT in the central memory device CM, the E-mail system representing a first exemplary service D. In this case, the data paraded at a first instant t1 are formed from two different data portions d1, d2, which ultimately belong together. The first data portion d1 is a header information item hd—to be transmitted as rapidly as possible to the subscriber station UT—with basic data that supply information about the existence of a retrievable E-mail. The second data portion d2 includes actual useful data and attachments, which often constitute a relatively large volume of data. Preferably, the first data portions d1 are correspondingly transmitted via the mobile radio components of the selected second set, that is to say via the third resource AC3.

Consequently, an item of information that an E-mail is retrievable is present in the subscriber station UT at a second instant t2, if appropriate items of information about the sender, a subject information item and optionally an access key already being present as well. In parallel with the transmission of the first data portions d1 or at a possibly also later instant t3, the subscriber station UT retrieves the actual data as the second data portions d2 via a local area network, for which purpose, in the second and selected set s2, a corresponding access to the sixth resource AC6 and via that to the central memory device CM is carried out. Optionally, the retrieval can also be effected at a later instant if a suitable local area network is not currently available and if for the data retrieval there is enough time until a suitable local area network is reached. It is also possible to select for the retrieval of a large volume of data a resource of a set s1 given higher priority or for the retrieval of a small volume of data a set s4 given lower priority, and correspondingly assigned resources.

In the exemplary embodiment illustrated in FIG. 1, at a fourth instant t4 the subscriber station UT passes into the radio range of the first local area network with the first access point AP1, which offers the seventh resource AC7. In an advantageous manner, after possibly an information exchange with the first server S1, the subscriber station UT recognizes that the server enables a possibility of access to the internet IP and the central memory device CM, but is not listed in the network information item s which was previously provided by the coordination device NMO and received at the starting instant t0. At a fifth instant t5, the subscriber station UT correspondingly communications a further network information item i7, which is transmitted to the coordination device NMO via the currently existing second resource AC2 and the first mobile radio system. After receiving the further network information item i7, the coordination device NMO creates an updated network information item s and transmits the latter, at a seventh instant t7, to the diverse connected systems and in particular the subscriber station UT. If the subscriber station UT has not itself already performed a suitable assignment of the seventh resource AC to the suitable sets s1-s4, such that the new seventh resource AC7 can also be taken into account, after receiving the updated network information item s the subscriber station UT can also access the newly available seventh resource AC7. Since the seventh resource AC7 is a local area network having the low data rate r1, this is assigned to the fourth set s4.

In addition, by way of example, at a sixth instant t6, that is to say before the transmission of the updated network information item s, a failure of the second local area network with the fourth resource AC4 has occurred, which has been conveyed by a corresponding further network information item i4 or a lack of a corresponding communication of the coordination device NMO. The possibility of access to the fourth resource, that is to say to the access point AP2 of the second local area network, is correspondingly omitted in the first set s1.

FIG. 2 shows, in addition to a table of the network information item s transmitted at the starting instant t0, a second table having the described updated network information item s transmitted at the seventh instant t7. Besides an updating of the network information item s in the case of changes, an updating can advantageously be carried out automatically at regular time intervals. In this case, the set information items of the sets s1, s2 given higher priority are advantageously to be updated at shorter time intervals than the set information items of the sets s3, s4 given lower priority.

Such a method procedure and corresponding apparatuses and subscriber stations offer an optimization of MRTD performance whilst at the same time reducing the power consumption without a significant increase in a control signaling by transmission of network information items s, i1-i8 and without significant changes in the software of suitable subscriber stations UT.

The possibility of the use of MRTD by mobile subscriber stations UT, in particular, is advantageously possible wherever different resources having typically different profiles and/or characteristics are available, an efficient selection of transmission modes of the resources currently available being offered according to the method.

Consequently, what is introduced is a subscriber- and service-class-based approach for selecting the most suitable resources and transmission modes for MRTD, such that a best possible MRTD utilization can be obtained with regard, in particular, to the throughput. Moreover, if a suitable MRTD transmission operating mode is selected, virtually similar resource channels can be formed for each subscriber station in order to be able to obtain optimum MRTD advantages with regard to the overall system and the respective subscriber even in traffic cells having high usage.

An operator or the coordination device NMO advantageously offers different subscriber classes with service-specific performance characteristics and guarantees, an adaptation to the respective currently available and accessible heterogeneous mobile infrastructure elements being carried out. A preselection of resources and transmission modes is obtained, a best possible adaptation being sought with regard to the individual subscribers or subscriber stations, traffic and service profiles. Resources having on average similar performance characteristics for MRTD are advantageous for advantageously configuring a multi-radio link cooperation. Preferably, virtually similar resources are taken for MRTD, which leads to an increased total MRTD gain. This holds true particularly when the remaining capacity of the high-performance resources is used for other traffic in the case of a high-load situation. A definition of subscriber and service classes which can be obtained by an optimizing MRTD performance correspondingly takes place in coordination with a network planning and a multi-radio link resource management.

For the selection of suitable resources and transmission modes for MRTD, it is possible advantageously to carry out the following general procedure in association with mechanisms for a carrier service and RRM (radio resource management).

In accordance with a first aspect, a so-called service level agreement (SLA) is defined between a subscriber or the subscriber station UT thereof and the coordination device NMO, a mapping onto the subscriber station or the user thereof being performed, and the availability of dedicated multiple resources and the cooperation thereof being examined. In accordance with a second aspect, the sets s1-s4 of the resources AC1-AC8 are formed and transmission modes and timescales in this regard are selected for MRTD.

Preferably, as can also be seen from FIG. 3, two types of sets for the resources and three MRTD transmission modes are defined as follows. With regard to the two types of sets, e.g. a candidate set is formed as candidate radio access set or candidate resource set and an active set is formed as a further resource or radio access set. The candidate set is preferably assigned all resources for radio accesses which, at the location of the subscriber station UT, fulfill a minimum required average signal quality and the sufficient likelihood of a connectivity and which can be registered by a common radio resource management with regard to a long-term existence. The active set is preferably defined by the common radio resource management from all radio accesses or resources which are contained in the candidate radio access set. The active set is preferably in turn subdivided into an active primary set of resources and into a secondary set of resources, wherein in this regard a high and respectively a medium timescale with regard to updatings are fixed.

With regard to the transmission modes, in particular a redundant parallel MRTD with a parallel transmission of packets which are assigned to a dataflow, a switched MRTD with exclusive transmission per packet of the data and point in time via a single one of the resources available from the active set, and a parallel MRTD with an alternating simultaneous transmission of packets which are assigned to a dataflow can be taken into account, wherein this is implemented in particular with regard to the primary active resource set.

Preferably, the updating period of the candidate set is greater than that of the active set. Within the period between updatings of the candidate set for the individual subscriber stations, the coordination device NMO or the subscriber stations UT can preferably monitor the performance of the active resources in order to access the optimum resources. The monitoring frequency for the active primary set and the transmission mode to be selected should preferably correspond at least to the setting of the superordinate updating frequency.

In accordance with the described embodiment, the transmission mode that is preferably to be selected is updated preferably at an interval as short as or shorter than an updating period of the active primary set. The updating period of the latter is preferably in turn less than the updating period of the active secondary set, with the result that the active primary set is updated more frequently. Preferably, the updating period of the secondary active set is less than the updating period of the active set and the latter is in turn preferably less than the updating period of the candidate set.

The radio access or resources groups and the transmission modes can be selected in various ways. In accordance with a first exemplary selection possibility, an active resource preselection is carried out dynamically for a subscriber station UT taking account of a service class of the subscriber station UT, which defines access possibilities, applications and access rights. In addition, cost-benefit functions (CBF) are taken into account, which are primarily based on an individual resource profile, that is to say which take account of e.g. a maximum acceptable movement speed of the subscriber station UT and a spatial coverage capacity with regard to a stable profile in order to form the candidate set individually if appropriate for the subscriber station. Moreover, the cost-benefit function metric is based inter alia on an average load and a likelihood of the offered conductivity of the candidate radio access systems on which the resources are offered. In this case, dynamic profiles are used to form the active sets from the resources of the candidate sets. Preferably, for subscriber stations UT having high mobility, systems having only local presence such as wireless local area networks WLAN are rated lower than resources represented suprarregionally, such as, for example access possibilities to mobile radio networks in accordance with GSM. This takes account of the fact that a continuous link with a lower rate in the case, in particular, of a rapidly spatially moving subscriber station UT is often more favorable with regard to the total throughput than an access to wireless local area networks WLAN that are in each case accessible only for a short time.

In the course of the active resource preselection, preferably the following rules are used for generating the CBF metrics for the resources. Thus, a resource which offers an optimum quality of service QoS is rated with the highest metric, for example is rated with a 1 in the case of a normalization. The metrics for other resources are normalized in accordance with this metric. The optimum quality of service QoS is determined for example by a call blocking rate, a bit error rate, a delay factor and the like. In an advantageous manner, mutually similar performances of different resources are rated with a relatively high metric with respect to one another. Correspondingly, resources having a performance with limited similarity are preferably assigned as a set property of a respective common set since experience shows that the best results can be obtained for the subscriber station UT if the latter, when using a plurality of resources for setting up radio links, accesses resources having comparable conditions for the transmission. Preferably, a resource adaptation to the respective service and the mobility of the subscriber station UT is also rated with a high metric. A wireless local area network WLAN having only small spatial coverage is rated with a low metric for a highly mobile subscriber or for the subscriber station thereof. Resource-specific costs such as, for example, a delay on account of an access reselection for a specific cooperating active set and with regard to a required signaling complexity are preferably likewise taken into account.

Two levels of subsets are preferably classified within the active set, wherein the classification is in turn preferably carried out by a common radio resource management by the coordination device NMO, for example. The active primary set and the active secondary set are correspondingly formed. Preferably, a channel status information item of the active primary set is evaluated with the highest frequency and a channel status information item, for example by measuring a pilot channel, of the active secondary set is evaluated by a measurement with lower frequency. The candidate set is updated with the lowest frequency due to the availability of all resources present in principle.

FIG. 3 shows in this regard five exemplary resources which are supported by the subscriber station UT. It schematically depicts the described subdivision and assignment of exemplary available resource configurations A-E which can be accessed by the subscriber station UT.

The assignments to updating intervals are represented against a scale with advancing time t. In this case, the report or updating period of the primary set s1, s2 is schematically depicted as the shortest updating period tp. An updating period ts of the secondary set s3 is the next longer. An updating period ta of the entire active set s1-s3 is even longer and an updating period tc for the entire candidate set s1-s4 is the longest.

At a first instant, the primary active set s1, s2 includes, in the first subset s1 thereof, a second configuration B formed from specific resources from among the resources with an identical set property or with an approximately comparable set property. The second subset s2 of the primary active set s1, s2 is formed by a third configuration C after the time 2·tp. The active secondary set s3 is formed by a first configuration A at the first instant and a fourth configuration D is provided as fourth available set s4.

At a second instant after the elapsing of the first updating period tp for the active primary set s1, s2 only the configurations thereof are updated. In the exemplary embodiment illustrated, no change arose. As can be discerned from the section encircled by a broken line, this results in an optimum transmission scheme selection between the channel status information items with respect to the primary active set s1, s2. After the elapsing of the updating period ts of the secondary set s3, which corresponds to the representation of the third column, for example image data are updated as parameters of a carrier service of a higher-layer protocol. At this point in time it is possible for the secondary set s3 to carry the subscriber traffic. After the elapsing of the updating period ta for the entire active set s1-s3, changes with regard to the configurations occurred in the exemplary embodiment illustrated. The first subset s1 of the primary active set s1, s2 now contains the first configuration A, the active secondary set s3, formed by the third available set, now contains the fourth configuration D, while the second configuration B is only assigned as the slowest link to the fourth set s4. After the updating period tc of the entire candidate set s1-s4, a re-evaluation and updating of the configurations for the various sets s1-s4 once again takes place. Instead of the first configuration A, a new configuration E now appears as a fifth conceivable configuration, by way of example.

Within the state duration of the active primary sets s1, s2, a rapid changeover can be effected between different MRTD transmission modes, in particular between redundant parallel MRTD, switched MRTD and parallel MRTD. The optimum MRTD operating mode selection is based in particular on the current channel status information from the primary resources and from the system requirements and thus from the current result of the cost-benefit function.

The following exemplary rules for MRTD transmission modes can be used taking account of corresponding timescales for a time planning. By way of example, minimum signal-to-noise values of the resources, which are incorporated in MRTD in particular as special values, can be used in order to decide on a transmission that can be carried out. Resources having a current signal-to-noise ratio below the thresholds lead to an excessively high bit error rate. In an advantageous manner, the subscriber station UT can report signal-to-noise values of the resources AC1-AC8 back to the coordination device NMO, this preferably does not take place more slowly than the channel changes take place, and taking account of the coherence time in order to choose an optimum MRTD mode. If the current signal-to-noise value is dominated by one of the resources, the switched MRTD mode is chosen, in which successive data are optionally received by one of a plurality of available resources, namely the most favorable resource. If the current signal-to-noise values of all of the resources are greater than the minimum threshold value for parallel MRTD, which is required for each specific individual resource, the parallel MRTD mode is chosen taking account of the total usage of the resource used and the operator's business policy, wherein one portion of the data is received via a first resource and another portion of the data is received via a second resource. If the current signal-to-noise values of all of the resources are indeed comparable but lower than the minimum threshold value for parallel MRTD, and if data given high priority are to be transmitted, redundant parallel MRTD is chosen, wherein all of the data are transmitted in parallel via a plurality of the available resources. In this case, specific costs of the transmission operating mode can also be taken into account, for example a delay on account of an access reselection for a specific cooperating active resource set and a required signaling overloading.

The active second set s3 is preferably likewise assigned to a high-layer link and serves for a potentially high peak throughput for elastic or variable traffic or for a low connectivity, wherein local area networks, for example, are switched in.

As a further additional or alternative selection possibility, active resources for a terminal or a subscriber station can be updated from time to time, for example for adaptation to load changes of the resources.

A further possible selection criterion lies in monitoring further resources, not contained in the candidate set, with a preferably even lower temporal frequency, in order to conserve the battery of the subscriber station UT and to reduce a signaling overhead. After such a further resource has been detected, the subscriber station UT can forward corresponding information items to the coordination device.

It is possible for the links between the primary active set s1, s2 and the secondary active set s3 to change back and forth. If this occurs, in particular services of higher layers, for example a source coding of a video codec, of another communication partner are advantageously reconfigured for a better-suited service. In this case, it is possible to use either a remote server or a base station for a downlink or for an uplink of the subscriber station UT.

Whenever new services are introduced or employed, the active set s1-s3 is advantageously likewise updated. If, by way of example, the subscriber station UT changes the service from a real-time voice service to a temporally unrestricted data service, e.g. a resource having a high data rate but small coverage such as a local area network can be allocated in order to obtain a higher metric, the rank of the active resource set being updated.

In an advantageous manner, transmission diversity problems as a result of new assignment delays of packets on account of excessively large differences in the transmission speeds of arbitrarily selected resources and a possible buffer memory overflow at the receiver are reduced by performing the selection of active resource sets and transmission modes with restricted performance differences. Correspondingly, an assignment of resources with comparable resource properties as set property is particularly advantageous in order to increase the reliability of the transmission via a plurality of resources in parallel with one another.

Three particular novel features should be emphasized in the context of the described method procedure. In accordance with a first aspect, a profile-based selection of a resource set for a multi-operating-mode terminal as a subscriber station takes place on the basis of CBF metrics taking account of the MRTD transmission modes of the resources, wherein in particular the subdivision into the candidate set s1-s4, the active primary set s1, s2 and the active secondary set s3 is taken into account as resource set. If a reconfiguration of the links between the active primary set s1, s2 and the active secondary set s3 takes place, this triggers a protocol-layer-overarching signaling between different protocol layers and/or a signaling between nodes of a respective one of the systems with regard to an optimum service.

In accordance with a second aspect to the emphasized, different updating rates are chosen for different layers of the resource sets in order to reduce battery power and radio signaling.

In accordance with the third aspect, a preferably optimum transmission node is chosen within the primary active set s1, s2.

A multi-radio link access network with two resources is considered by way of example below. The first resource is formed by a packet data network based on the GPRS standard at 128 Kbps, and the second resource is formed by a local area network having high usage and an effective net data rate of 37 Mbps and a free capacity of 220 kbps. Moreover, the subscriber station is assumed to be a mobile terminal which supports these two resources and has a service class of 300 kbps for a data download in accordance with a contract with the coordination device. In such a case, MRTD is selected via both resources, such that data packets are transmitted simultaneously, alternatively or redundantly via both resources in order to achieve overall 300 kbps during the download phase of the file. Preferably, the transmission mode chosen is the parallel MRTD mode, which is made possible on account of the available radio resources.

In accordance with another example, an operator offers a mobile radio infrastructure based on the UMTS standard and a peak data rate of 2 Mbps, a high-speed downlink packet data access with a peak data rate of 10 Mbps and a local radio data network according to the WiMAX standard with a peak data rate of 15 Mbps. The operator additionally offers different subscriber classes having different charges. Furthermore, the existence of a specific subscriber class which offers an average file download rate of e.g. 768 kbps is assumed by way of example. If a nomadic subscriber who has registered for this class would like to download data from the internet by his multi-radio link subscriber station at a location at which all resources are available with average signal-to-noise values, the operator will firstly choose the high-speed downlink packet access and a local area network on account of the high performance comparability thereof. Secondly, for instance similar resources, offering on average 384 kbps, from both resources, the high-speed downlink packet access and the local radio data network, are chosen in order to download the datastream and to enable an average data rate of 768 kbps using parallel MRTDs. In this way, the operator of the subscriber station can offer the maximum possible gain of MRTD with regard to radio link efficiency, robustness and performance gain.

The following advantages should be emphasized. A maximum performance advantage of MRTD with regard to the combination of different types of resources can be achieved. This is made possible since an inherent MRTD performance deterioration at the radio interface, which would arise through the use of resources having different performance characteristics, is avoided. The likelihood of a packet loss on account of a buffer memory overflow at the receiver on account of a delay which can arise as a result of slower resources is furthermore avoided. The likelihood of segments or packets becoming disordered is also reduced. MRTD offers various modes: a switched mode, a parallel mode and a parallel-redundant mode. The use of simultaneously an active resource set and a transmission mode selection enables an additional diversity gain in the parallel-redundant mode, a multiplex gain in the case of a parallel operating mode for the traffic and also a grouping gain in the parallel mode and in the switched mode. The battery consumption of the subscriber station and a signaling overloading are significantly reduced since the candidate resource set, including all available resources, is subdivided into a plurality of accessible sets with resources which have in each case at least one common set property. In particular, a primary active resource set and a secondary resource set are advantageously introduced.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a radio communication in a multi-radio link communications system, comprising:
    transmitting, to network devices and/or to subscriber stations by a coordination device, a network information item regarding available resources which are available for transmitting data;
    assigning the available resources to sets based on the network information item, the resources assigned to different sets depending on in each case at least one common set property with at least one resource assignable to more than one set during all of a period of time,
    wherein the coordination device is incorporated in a network-side device,
    wherein said transmitting sends the network information item to the network devices of different communications systems,
    wherein said transmitting sends the network information item to at least one of the subscriber stations which can communicate in parallel via at least two different resources, and
    wherein said method further comprises transmitting the data via the at least one of the subscriber stations via at least two resources selected depending on the network information item.

2. The method as claimed in claim 1, further comprising transmitting an additional information item to a network-side device from one of the subscriber stations for updating the network information item, the additional information item having information content which deviates with respect to the network information item received by the one of the subscriber stations with regard to a resource availability detected by the one of the subscriber stations.

3. The method as claimed in claim 2, wherein the different sets are provided individually by the coordination device for the subscriber stations.

4. The method as claimed in claim 3, wherein data portions of service data which are identical in kind are transmitted via different resources of one of the sets.

5. The method as claimed in claim 3, wherein data portions of service data which are different in kind are transmitted via resources of different ones of the different sets.

6. The method as claimed in claim 5, wherein the data portions that are of a first kind are transmitted as basic information items and the data portions that are of a second kind are transmitted as additional information items of a service.

7. The method as claimed in claim 6, wherein the data portions of the first kind are formed from real-time data and the data portions of the second kind are formed from non-real-time data.

8. The method as claimed in claim 7, wherein a respectively comparable obtainable, in particular time-dependent, data rate for said transmitting of the data is assigned to the different sets as one of the at least one common set property thereof.

9. The method as claimed in claim 7, wherein a service property is assigned to the different sets as one of the at least one common set property thereof.

10. The method as claimed in claim 9, wherein the service property is a local or supraregional availability.

11. The method as claimed in claim 9, wherein a scope of access authorization of the one of the subscriber stations or of another subscriber or another subscriber station communicating with the one of the subscriber stations is assigned as the service property.

12. The method as claimed in claim 7, wherein said assigning of the available resources to the sets changes based on at least one of changes in the resource availability and selection from among the sets at different time intervals.

13. The method as claimed in claim 12, wherein said assigning of the available resources to the sets is carried out depending on a current network usage.

14. The method as claimed in claim 13,
    wherein the different resources include radio resources of communications systems which are technologically different in kind, and
    wherein said assigning assigns the radio resources to at least one of mobile radio communications systems and local radio data networks.

15. The method as claimed in claim 13, wherein the different resources are different radio resources of an individual communications system.

16. An apparatus of a multi-radio link communications system for performing a method for operating a radio communication in a multi-radio link communications system of network devices and subscriber stations, comprising:

- an interface transmitting a network information item regarding available resources between the network devices or between at least two network devices and one of the subscriber stations in parallel, wherein the interface transmits the network information item to the network devices of different communications systems, and to at least one of the subscriber stations which can communicate in parallel via at least two different resources, and wherein the interface transmits the data via at least one of the subscriber stations via at least two resources selected depending on the network information item; and
- a control device providing the network information item with sets of available resources, where the available resources within each of the sets have a common set property and at least one resource assignable to more than one set during all of a period of time.

17. The apparatus as claimed in claim 16, wherein said control device is disposed in a coordination device communicating with the network devices of different communications systems while taking into account different resources of the different communications systems.

18. The apparatus as claimed in claim 17, wherein the different resources are radio resources of the different communications systems which are technologically different in kind, the radio resources being assigned to at least one of mobile radio communications systems and local radio data networks.

19. The apparatus as claimed in claim 17, wherein the different resources are different radio resources of an individual communication system.

\* \* \* \* \*